(12) United States Patent
Martini et al.

(10) Patent No.: US 8,006,270 B2
(45) Date of Patent: Aug. 23, 2011

(54) METHOD AND SYSTEM FOR DELIVERING MULTIMEDIA CONTENTS TO A SET TOP BOX USING A MOBILE TELEPHONY NETWORK

(75) Inventors: Giovanni Martini, Turin (IT); Laura Contin, Turin (IT)

(73) Assignee: Telecom Italia S.P.A., Milan (IT)

( * ) Notice: Subject to any disclaimer, the term of this patent is extended or adjusted under 35 U.S.C. 154(b) by 669 days.

(21) Appl. No.: 11/794,469

(22) PCT Filed: Dec. 30, 2004

(86) PCT No.: PCT/EP2004/053729
§ 371 (c)(1),
(2), (4) Date: Aug. 28, 2007

(87) PCT Pub. No.: WO2006/069603
PCT Pub. Date: Jul. 6, 2006

(65) Prior Publication Data
US 2010/0017816 A1    Jan. 21, 2010

(51) Int. Cl.
H04N 7/16     (2006.01)
H04N 9/00     (2006.01)
H04M 1/725    (2006.01)

(52) U.S. Cl. ............................ 725/62; 725/9; 455/412.2
(58) Field of Classification Search .................... 725/62, 725/31, 25, 9; 455/412.2; 713/182; 726/3; 705/75

See application file for complete search history.

(56) References Cited

U.S. PATENT DOCUMENTS

| 2003/0060157 A1* | 3/2003 | Henrick ............... 455/3.04 |
| 2003/0110209 A1* | 6/2003 | Loui et al. ............ 709/203 |
| 2004/0128688 A1* | 7/2004 | Seo ....................... 725/62 |
| 2004/0249962 A1  | 12/2004 | Lecomte |

FOREIGN PATENT DOCUMENTS

| DE | 102 25 435 A1  | 12/2003 |
| EP | 1 067 772 A1   | 1/2001  |
| EP | 1 217 828 A2   | 6/2002  |
| EP | 1 467 576 A1   | 10/2004 |
| FR | 2 832 014      | 5/2003  |
| WO | WO 01/37567 A1 | 5/2001  |
| WO | WO 03/024107 A1 | 3/2003 |
| WO | WO 03/056830 A1 | 7/2003 |
| WO | WO 03/094123 A1 | 11/2003 |

OTHER PUBLICATIONS

International Search Report from the European Patent Office, Sep. 20, 2005.

* cited by examiner

*Primary Examiner* — Hoang-Vu A Nguyen-Ba
(74) *Attorney, Agent, or Firm* — Finnegan, Henderson, Farabow, Garrett & Dunner, L.L.P.

(57) ABSTRACT

A method for enabling use of contents by a user of at least one set top box adapted to receive broadcast TV signals, includes: establishing an association between at least one identifier of the user in a communications network, and at least one identifier of the at least one user's set top box; notifying the user via the communications network of the availability of the contents, wherein the notifying includes exploiting the at least one identifier of the user in the communications network; upon receiving a confirmation by the user, delivering the contents to the user's set top box, wherein the delivering includes identifying the at least one user's set top box exploiting the at least one identifier thereof.

47 Claims, 6 Drawing Sheets

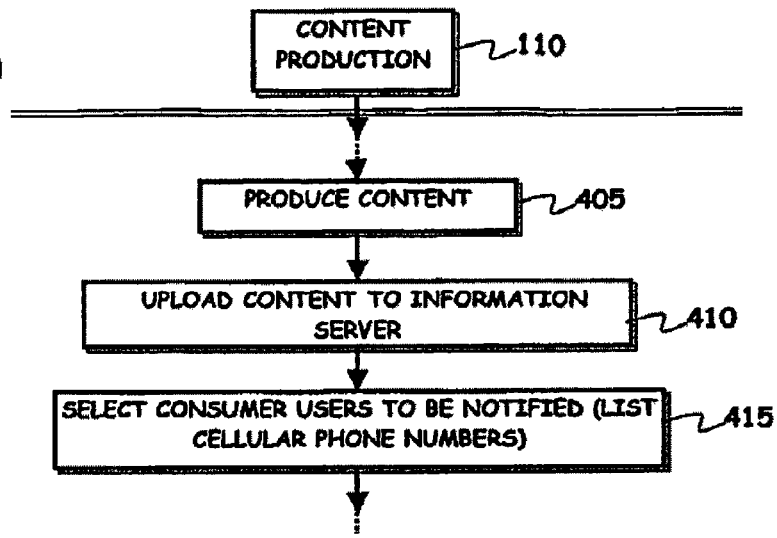
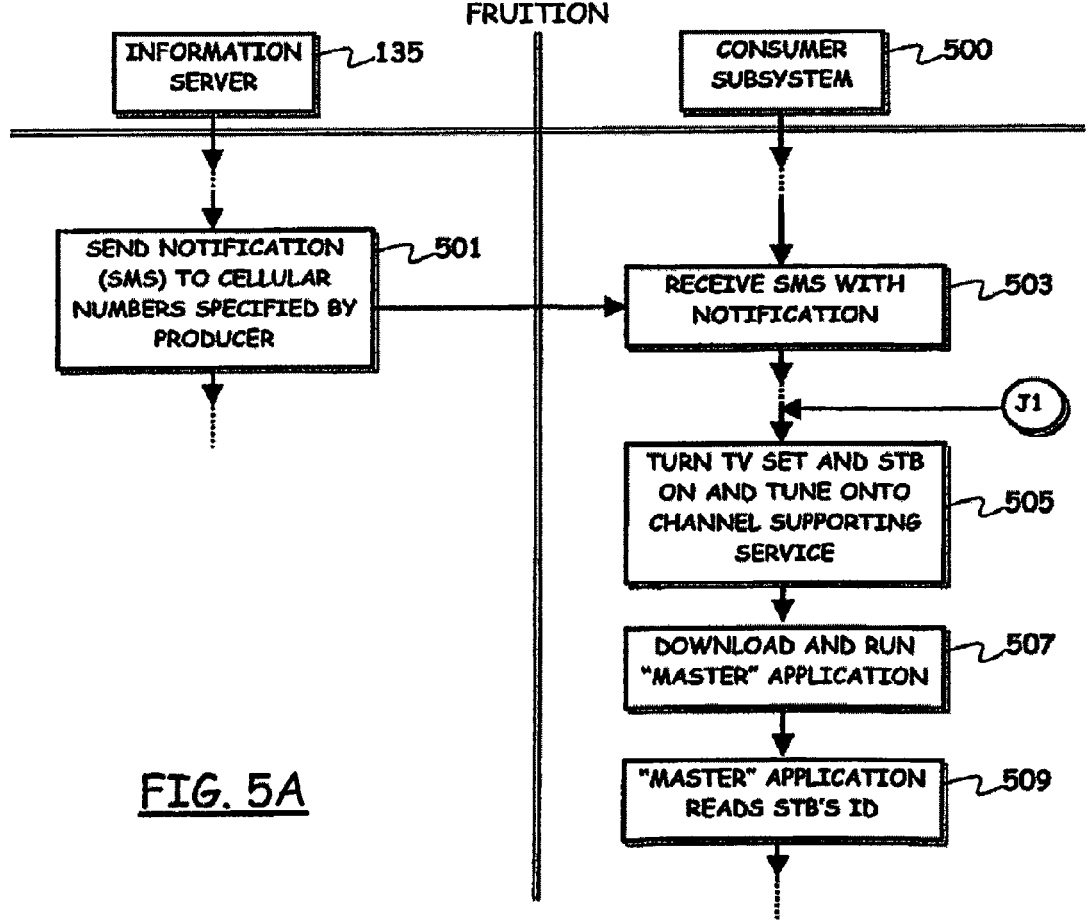

METHOD AND SYSTEM FOR DELIVERING MULTIMEDIA CONTENTS TO A SET TOP BOX USING A MOBILE TELEPHONY NETWORK

CROSS REFERENCE TO RELATED APPLICATION

This application is a national phase application based on PCT/EP2004/053729, filed Dec. 30, 2004.

FIELD OF THE INVENTION

The present invention generally relates to the field of telecommunications, including TeleVision (TV) networks, data communications networks (such as the Internet) and mobile communications networks (such as mobile, telephony networks). In particular, the invention concerns a method and a system for enabling the reception of multimedia contents at a user's TV set via a user's mobile, communication terminal (e.g., a mobile phone).

BACKGROUND OF THE INVENTION

Thanks to the recent advent of digital TV transmissions technology, TV broadcasters are now capable of providing much more than the traditional, analog broadcast TV.

The transmission of digital TV signals may occur in different ways. For example, in Digital Terrestrial Television (DTT) networks, the broadcast signal is broadcast "over the air", and is received by an antenna similar to that used for receiving analog TV signals. Other means for broadcasting digital TV make use of satellites or cables.

Digital TV can be enjoyed using traditional TV sets exploiting a so-called "Set-Top Box" (STB), which is an electronic equipment basically adapted to decode signals, particularly digital signals, received, e.g., through the TV antenna, and to provide the decoded signals to the TV set for displaying the multimedia content on the TV monitor.

Advanced STBs can be more than just signal decoders, and may be programmed to execute applications. Essentially, the STB comprises a programmable data processing apparatus (a computer) adapted to run software, which decodes the digital TV signal and also executes the application software.

In particular, such applications that may be executed by the STB may allow an interaction of the user, e.g. through the STB or, possibly, the TV set remote control device, with service providers in an IP network (typically the Internet), over an available communications network, forming the so-called "return channel"; which is the physical path used by the STB to enable the client interact with the server of the service provider; for example, the return channel may consist in a dial-up connection over the Public Switched Telephone Network (PSTN) to an access provider providing access to the IP network, using an internal or external modem, or an xDSL line, or a wireless connection, e.g., a connection to a GPRS or packet-switched) UMTS network.

Interactive TV (iTV) can be exploited by users to send information (e.g., votes, questionnaires, requests for a service) back to a service center in the IP network, through the STB's return channel.

Examples of iTV involving a cooperation of a broadcast iTV network with other communications networks are known in the art.

For example, EP-A-1467576 describes a method for selecting and tuning a broadcast processing system (a combination of an STB and a TV set) to a broadcast channel. The viewer uses a mobile terminal for connecting to a mobile service, for example with the WAP or a Web browser, or utilizing SMS messages. The mobile terminal downloads a mobile application, such as a calendar event that alerts the viewer when a selected TV program is about to start.

The STB, having a Bluetooth® communication module or other wireless interface, is instructed by the mobile terminal and tunes onto the selected program.

In WO 03/56830, a user contacts a server arrangement via the mobile terminal, and receives a request for an ID number of the STB he/she is present at. The user sends the ID of the STB to the server arrangement, which responds sending a control code to the STB, which is shown to the user and which the user sends back to the server arrangement via the mobile terminal, to show that he/she is actually present at that particular STB. The connection is thus established, and the user is inquired for the desired service.

WO 03/94123 describes an iTV payment system used for the purchase of goods, services or entry into a game or competition. The user sends a code derived from a requested service and a unique user apparatus identifier number, via a mobile phone and by messaging to a designated number; once the message is received by the messaging center, the message is transmitted to a broadcaster/service provider which then interprets it, identifying which user's apparatus is requesting the services, and which service is being requested. The user pays with the mobile phone, and the receipt of the message is the confirmation to the broadcaster/service provider that a charge has been billed to the user's mobile phone: the broadcaster/service provider can then instruct its broadcasting/transmitting equipment to provide access to the desired service.

SUMMARY OF THE INVENTION

The Applicant has faced the problem of making contents available to users through STBs, particularly iTV STBs.

In particular, the Applicant has faced the problem of how to make such contents exploitable by users whenever and, possibly, wherever they prefer.

To this purpose, the Applicant has observed that it would be useful if an iTV user could be made aware of the availability of contents without the need that his STB be on and possibly tuned onto a specific program.

Essentially, the Applicant has found that communications terminals, such as mobile phones (or mobile stations, or users equipments) of the type enabling voice (and, possibly, video and/or data) communications over mobile telephony networks like GSM, GPRS, EDGE, UMTS, WiFi networks, or Personal Computers (PCs), can be advantageously exploited for notifying an iTV user of the presence of contents that he/she can access via his/her STB, and for enabling the sending of the contents to the user's STB.

Thus, thanks to the present invention, an iTV user can be notified of the availability of contents that he/she can access via the STB timely, individually, in any place he/she is.

Thanks to the user's communications terminal unique identification in the communications network, by associating such a unique user's identification with an iTV Set-Top Box (STB), it is possible to make user-dependent the fruition of contents.

According to an aspect of the present invention, a method is provided for enabling use of contents by a user of at least one set top box adapted to receive broadcast TV signals. The method comprises:

establishing an association between at least one identifier of the user in a communications network, and at least one identifier of said at least one user's set top box;

notifying the user via the communications network of the availability of the contents, wherein said notifying includes exploiting said at least one identifier of the user in the communications network, upon receiving a confirmation by the user, delivering the contents to the user's set top box, wherein said delivering includes identifying the at least one user's set top box exploiting said at least one identifier thereof.

According to another aspect of the present invention, a system is provided which comprises:

at least one set top box adapted to receive broadcast TV signals;

at least one communications network; wherein said system is adapted to:

establish an association between at least one identifier of a user of the at least one set top box in a communications network, and at least one identifier of said at least one user's set top box;

notify the user via the communications network of the availability of contents usable by the user, by exploiting said at least one identifier of the user in the communications network; and upon receiving a confirmation by the user, identify the at least one user's set top box exploiting said at least one identifier thereof and delivering the contents to the user's set top box.

According to a still further aspect of the present invention, a server apparatus is provided, and is adapted to enable use of contents by a user of at least one set top box adapted to receive broadcast TV signals.

The server apparatus is adapted to:

establishing an association between at least one identifier of a user of the at least one set top box in a communications network, and at least one identifier of said at least one user's set top box;

notifying the user via the communications network of the availability of contents usable by the user, by exploiting said at least one identifier of the user in the communications network; and upon receiving a confirmation by the user, identifying the at least one user's set top box exploiting said at least one identifier thereof and causing the delivery of the contents to the user's set top box.

BRIEF DESCRIPTION OF THE DRAWINGS

The features and advantages of the present invention will be made clear by the following detailed description of an embodiment thereof, provided by way of non-limitative example, description that will be conducted making reference to the annexed drawings, wherein:

FIG. 4 is a schematic flowchart showing some steps of a contents production and publishing phase, in an embodiment of the present invention; and FIGS. 5A-D depict a schematic flowchart showing the main steps of a contents fruition phase, in an embodiment of the present invention.

DETAILED DESCRIPTION OF THE PREFERRED EMBODIMENT(S) OF THE INVENTION

Figure 1:
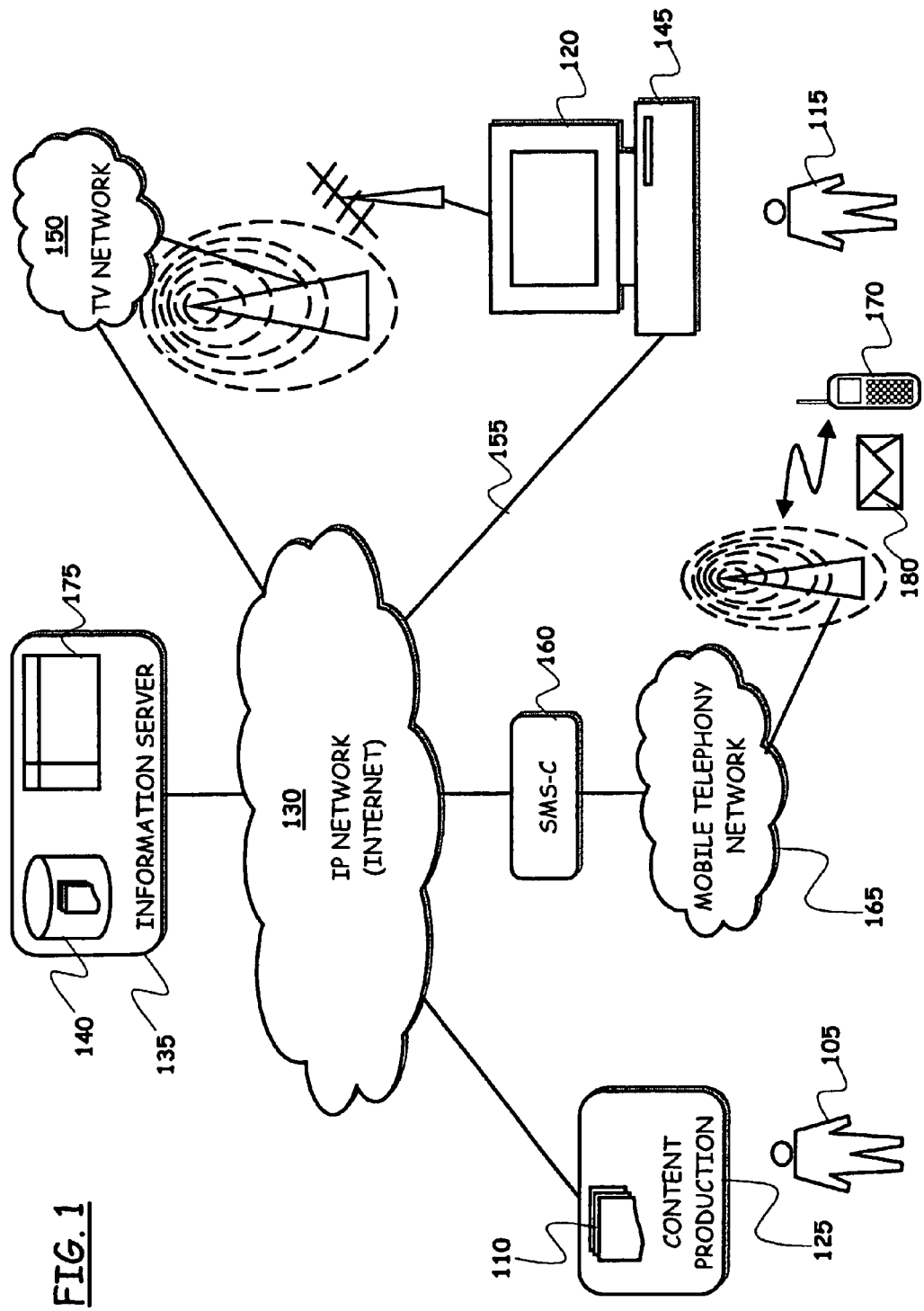
FIG. 1 schematically shows an exemplary system scenario in which a method according to an embodiment of the present invention is applicable.

Making reference to the drawings, in FIG. 1 there is schematically shown an exemplary system scenario in which a method according to an embodiment of the present invention is applicable. In particular, the exemplary scenario that is herein considered relates to the fruition, via a TV set equipped with an iTV Set-Top Box (STB) (either external or integrated in the TV set), of multimedia contents (e.g., images, photos, videos, audio, text, as well as any other contents adapted to be fruited through a TV set) published on a server (information server) of a packet data network, particularly an IP network, for example the Internet. It is pointed out that this scenario is however not limitative to the present invention.

In the drawing, reference numeral 105 denotes a content producer user, which is assumed to be the producer of (a) content(s) 110 intended to be fruited by other users (consumer users), like a consumer user 115, particularly through a TV set 120. The content 110 is generally intended to be a digital multimedia content, including images, like photos and graphics, videos, audio, e.g., music, text or a combination thereof; the specific nature of the content 110 is not limitative to the present invention.

The producer user 105 produces the content 110 using a production subsystem 125; the production subsystem 125 is herein intended to include any means by which a content 110 can be produced, such as for example a camera for taking photos, possibly a digital camera, a media center (a personal computer with high-capacity storage, broadband connectivity and video cards), a computer (e.g., a Personal Computer—PC) running suitable applications for downloading the photos from the camera and for managing them, for example archiving, manipulating, editing and the like.

The production subsystem. 125 is also intended to include a communications terminal; for example, the (PC of the) production subsystem 125 has a suitable connection to an IP network 130 such as the Internet. For example, the connection may include a modem and a dial-up connection over a PSTN, or an xDSL connection to an Internet access provider (not shown), or a connection (e.g., a Wi-Fi connection) to a LAN with a gateway to the IP network 130. A File Transfer Protocol (FTP) client and/or browser, and/or a custom application may in particular be provided, for transferring files and/or connecting to the World Wide Web (WWW).

It is remarked that the specific nature of the production subsystem 125 is per-se not limitative to the present invention; it might for example include a mobile communications terminal, e.g. a GPRS, EDGE, UMTS, IMS mobile phone, Wi-Fi phone as well as include any software application, such as a web application, a mobile application (e.g., based on Symbian, J2me or equivalent operating system) resident or downloaded onto the producer user's communications terminal, or an interactive TV (iTV) application running on an Set Top Box (STB). Also the connection of the production application 125 to the Internet 130 is per-se not critical to the present invention, and it may include a connection through a LAN and a suitable gateway, an xDSL connection, a Wi-Fi connection, a GPRS, EDGE or UMTS connection.

Through the connection to the Internet 130, the production application 125 communicates with an information server 135, connected in turn to the Internet 130.

The information server 135 is the publishing platform that producer users like the user 105 exploit for publishing their multimedia contents so as to render them adapted to fruition by other users. In particular, the information server 135 is adapted to receive from producer users' production subsystems, e.g. the production subsystem 125 of the producer user 105, the multimedia contents 110, store the received content 110 in a content repository 140, and distribute the multimedia contents to other, consumer users like the user 115.

For the fruition of the multimedia contents published by the producer user 105 through the information server 135, the consumer user 115 has a TV set 120 equipped with a STB 145, particularly an iTV STB; in particular, but not limitatively, the iTV STB 145 may include a DTT receiver/decoder, a satellite digital TV receiver/decoder, a CATV receiver decoder; hereinafter, it will be assumed, merely by way of example, that the STB 145 is a DTT STB, albeit the specific nature of the iTV STB is not critical to the present invention. Alternatively, the consumer user 115 may exploit a TV set with integrated (DTT) STB functionalities, or a media center equipped with a DTT tuner or IPTV (Internet Protocol TV) access.

Exploiting the STB 145, the consumer user 115 can receive, decode and display contents from a TV network 150, e.g. a terrestrial or satellite or cable TV broadcasting network, broadcasting programs over channels or bouquet of channels.

The iTV STB 145 includes a programmable data processing apparatus essentially similar to a computer, adapted to execute programs. The STB thus includes a data processing unit, like a central processor (CPU) of a computer, communicating over a bus with volatile (RAM) and non-volatile (ROM) memory resources, the latter exploited for non-volatile storage of code (like the bootstrap code) and data, the former used as a working memory for the execution of the operating system and other programs.

The iTV STB 145 is further adapted to support data communications through a connection 155 to Internet 130; such a connection 155 forms the so-called "return channel" of the STB. The return channel 155 may in particular be a PSTN (dial-up) connection (to an Internet access provider), or an xDSL connection, or a wireless connection, e.g., a Wi-Fi connection or a mobile (GPRS, EDGE, UMTS) connection to the Internet, or any other connection: the nature of the connection is not critical to the present invention.

According to an embodiment of the present invention, the information server 135 is adapted to communicate with a Short Message Service Center (SMS-C) 160 of a mobile telephony network 165, e.g., a GSM or UMTS network. Through the SMS-C, the information server 135 can send and receive SMS messages to (SMS supporting) mobile communication terminals of the consumer users, such as the mobile communications terminal 170 of the consumer user 115.

Still according to an embodiment of the present invention, the information server 135 handles, in respect of consumer users that are subscribers to the multimedia delivery service; such as for example the consumer user 115, a table 175 adapted to establish an association between STB identifiers, univocally identifying users' STBs, and identifiers of the users within the mobile communications network, for example the mobile telephony number (cellular phone number) associated with the Subscriber Identity Module (SIM) provisioned to the user and inserted in the mobile communications terminal 170. According to an embodiment of the present invention, the information server 135 exploits the information contained in the association table 175 for associating a given STB, like the STB 145, with the mobile telephony number of the STB's user 115, for notifying the user 115 of the presence of contents to be fruited, and for negotiating with the user 115, through the mobile communications terminal 170, the mobile telephony network 165 and the SMS-C 160, an authorization to deliver the multimedia contents present in the repository 140 to the STR 145, as will be described in greater detail in the following.

Figures 2, 3:
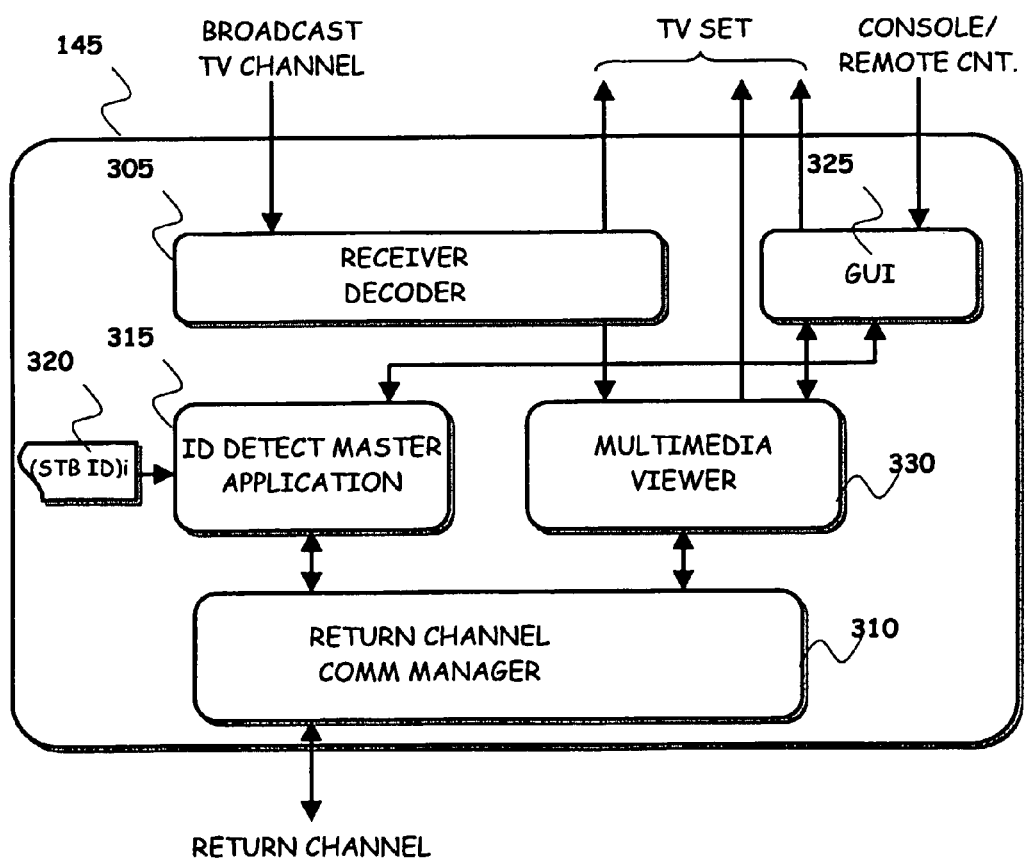
FIG. 2 schematically shows a consumer users' table used by an information server of the system of FIG. 1 for establishing an association between a consumer user's STB identifier and a mobile communications terminal identifier, in an embodiment of the present invention.
FIG. 3 pictorially shows a consumer user's STB in terms of functional blocks relevant to the understanding of the invention embodiment herein described.

FIG. 2 schematically shows the structure of the association table 175, in an exemplary embodiment of the present invention. The table 175 includes one (possibly, more than one) entry for each subscriber consumer user, like the user "USERi" identified in FIG. 1 by reference numeral 115. This generic table entry includes a plurality of fields, particularly at least one pair of fields denoted as "STB ID" and "STB STATUS", corresponding to a respective STB owned or currently exploited by the subscriber user; the field "STB ID" is intended to contain a unique identifier of the user's STB, like the identifier "(STB ID)i" of the STB 145, whereas the field "STB STATUS" is intended to be a flag indicating a current status (on/off) of that STB. A field "CELL PHONE NUMBER" is intended to contain the number of the STM in the mobile communications terminal (cellular phone) 170 of the user 115. In case the user has more than one STBs and/or cellular phone, more than one of these fields might be provided, thereby the generic user may communicate two or more cellular phone numbers and/or STR ID to the information server.

Coming back to FIG. 1, as motioned in the foregoing, in addition to receiving and decoding the TV signal, the STB 145, including a programmable data processing apparatus, is further adapted to run more or less sophisticated software applications.

In particular, the STB 145 is preferably adapted to run applications whose code may for example be dynamically transmitted to the STB over the TV network 150, embedded in a transport strewn associated with the broadcast TV signal: by tuning the STB 145 onto a proper TV channel, the STB 145 can receive, associated with the broadcast TV program, a "master" application which, in the case of DTT technology, is for example an MHP (Multimedia Home Platform) Xlet.

It is however pointed out that the specific way the application code to be executed by the STB is rendered available thereat is not critical to the present invention: for example, the code may be pre-installed, or be downloaded through the return channel from, e.g., the information server 135.

According to an embodiment of the present invention, the STB 145 is adapted to run a master application which is responsible for assisting the information server 135 in establishing and maintaining the association, in the table 175, between the number(s) of the user's cellular phone 170 and the unique identifier of the STB 145. Reference is made to FIG. 3, which depicts, schematically and in terms of functional blocks relevant to the understanding of the invention embodiment herein considered, the structure of the STB 145. It is pointed out that any one of the different functional blocks may include hardware components, software components, or, more typically, a mix of hardware and software.

The STB 145 includes a receiver/decoder 305 adapted to receive, decode and feed to the TV set (for being displayed to the consumer user) the TV signal broadcast by the TV network 150; the receiver/decoder 305 includes a tuner, by which the user can tune the STB onto desired TV channels.

The STB further includes a return channel communication manager 310, enabling the STB connecting to, e.g., the Internet 130 so as to establish the return channel 155 with, in the example, the information server 135; the return channel communication manager 310 may be intended to include communication devices such as a dial-up modem, an xDSL modem, a GPRS or UMTS card, or these devices may be external to the STB 145.

An STB ID detect application 315 is executed by the STB 145; the STR ID detect application 315 is for example an application, e.g. an MPH Xlet, whose code is received through a transport stream associated with broadcast transmissions on a selected TV channel, on which the user 115 may have to tune the STB 145 for enjoying the multimedia contents delivery service. The ID detect application 315 is adapted to extract an STB identifier 320 "(STB ID)i" of the STB 145, stored for example in non-volatile way in the STB's ROM, or written in a smart card which is provisioned to the user 115 upon subscription of the service (most STBs are equipped with a smart card reader); alternatively, the STB identifier may be an IP address of the STB on the Internet (when connected thereto), or the user's PSTN or ISDN or mobile telephony numbers from which the call to establish the connection to the Internet is placed, or any other piece of information adapted to univocally identifying the STB, for example a MAC (Media Access Control) or NIC (Network Interface Card) address.

The ID detection application 315 interacts with the return channel communication manager 310, for communicating with the information server 135, in particular for sending the read identifier to the information server 135 over the return channel 155.

The STB further includes a Graphical User Interface (GUI) 325, adapted to enable the user 115 interact with the STB, e.g. via a console and/or a remote control, and a media viewer/player 330, for viewing/playing the multimedia contents through the TV set.

The operation of the system will be hereinafter described, according to an embodiment of the present invention.

Upon subscription to the service, the information server 135 creates an entry USERi for the subscriber user 115 in the association table 175. From then on, the user 115 is entitled to the fruition of multimedia contents published through the information server 135 by producer users, such as the user 105. This fruition could be subject to rights management policy, in case of premium contents, and to charging.

In a production and publishing phase, the multimedia contents are produced by a generic producer user, like the producer user 105, and they are published through the information server 135. In particular, as depicted in the schematic flowchart of FIG. 4, the user 105 produces the contents 110 (block 405), for example he/she takes some (digital) photos or videos with a digital camera and downloads the photos or video to his PC, or the photos are taken with a mobile phone equipped with an embedded camera.

The producer user then connects to the information server 135 and uploads the produced contents (block 410). The uploaded contents may be assigned a unique identifier (e.g., a string of letters or numbers, like "777", for example) by the information server 135, which stores them in the contents repository 140.

The producer user 105 may additionally specify a list of one or more consumer users, like the user 115, which he/she desires be notified of the presence of the newly published contents (block 415); the producer user may in particular specify, for each desired consumer user, a respective cellular phone number, by manually inputting it, or he/she can select the desired consumer users out of an address book, either managed locally to his/her premises, or managed remotely at the information server and accessible through a Web page.

The production and publishing phase ends.

A fruition phase of the published contents is schematically depicted in the flowchart illustrated in FIGS. 5A-D, wherein a block denoted by reference numeral 500 is intended to identify a consumer sub-system, for example the sub-system of the consumer user 115, including the consumer itself, his/her cellular phone 170, the STB 145, the TV set 120.

The information server 135, after having received from the producer 105 and stored in the repository 140 the new contents, prepares a notification SMS to be sent to the consumer users specified by the contents producer; the information server 135 connects to the SMS-C 160, which delivers the notification SMS to the cellular phones of all the selected consumer users, among which the user 115, for example (block 501).

Advantageously, the notification SMS 180 sent to the consumer users is formatted in a peculiar way: the SMS sent by the SMS-C has the sender number obtained by combining digits representing an emitting "large account" corresponding to the information server 135, and digits representing and univocally identifying, at the information server level, the specific contents object of the notification by the information server 135. For example, let it be assumed that the digits representing the emitting large account are "333", whereas the digits identifying the contents are, as in the above example, "777": in the SMS sent to the consumer users the digits representing the sender number thus are "333777"; thus, the notification SMS includes information identifying the contents object of the notification. This mechanism, which as will be seen later allows implementing an easy reply procedure by the users receiving the notification SMS, requires a proper configuration of the SMS-C 160, and a proper interface of the SMS-C 160 with the information server 135, both of which are per-se known in the art.

Each consumer user specified by the producer, like the user 115, receives on his/her mobile communications terminal 170 the notification SMS 180 (formatted as previously described) announcing the availability of the contents 110 (block 503). The consumer users are thus made aware of the presence of new contents ready to be fruited.

When the consumer user 115 is in condition or decides to do so, he/she turns his/her TV set 120 and STB 145 on, and tunes the STB onto one of the TV channels which support the service (block 505); it is observed that the consumer user is free to do this whenever and wherever he/she wants, for example a few hours, or days later than the receipt of the notification by the information server, and in any location whereat there is a suitable STB available.

Upon tuning the STB 145 onto the selected TV channel, a "master" Xlet, for example an MHP Xlet, whose code is embedded in the transport stream of the TV channel is automatically downloaded and executed on the STB 145 (block 507); the master Xlet, once executed, implements the ID detection master application 315 schematically depicted in FIG. 3.

The ID detection master application 315 detects the identifier 320 of the STB 145 in which it is running (block 509), to be communicated to the information server 135. The value ("(STB ID)i") of the STB's identifier is opaque to the final user, and is a value that identifies univocally the STB 145. As mentioned in the foregoing, multiple options are available for selecting the proper identifier to be communicated to the information server: it may for example be stored and read out from a non-volatile storage area in the STB, or be stored on a smart-cart provisioned to the user.

The ID detection master application 315 then communicates the detected STB's ID to the information server 135 by using the return channel 155 (block 511); this involves establishing a connection with the information server through the Internet (if such a connection is not already established). In this way, the ID detection master application 315 informs the information server about the fact that that specific STB, univocally identified by that specific STB's ID, is currently tuned onto a specific channel (the channel from which the master Xlet is received) and, supposedly, a viewer is watching it.

It is observed that the ID detection master application may operate in "autorun" mode, so that as soon as it is downloaded from the broadcast channel, it is put into execution, it detects the STB's ID, it sets up the return channel, e.g. by establishing a connection to the Internet, and it transmits the STB's ID to the information server by using the return channel.

Also, the ID detection master application can maintain permanent connection with the information server, or alternatively it may freeze after having communicated the STB's ID.

The information server 135 receives from the STB 145 the STB's ID "(STR ID)i" (block 513). In this way, the information server 135 is made aware of the fact that that specific STB 145 is currently on and running, and tuned onto the correct TV channel.

Looking up in the association table 175, the information server 135 checks whether the received STB's ID is present in the table (and it is associated to at least a cellular number) (decision block 515).

In the affirmative case (exit branch "Y" of decision block 515), the information server 135 sets the STB status flag to "ON" in the table 175 (block 517), then waits for the reply by the consumer user 115 to the notification SMS.

In the negative case, i.e. if no entry is found in the table 175 containing the received STBs's ID (exit branch "N" of decision block 515), the information server 135 communicates this to the ID detection master application 315 (through the return channel 155) (block 519).

Upon receiving such a communication, the ID detection master application 315 then interactively prompts the user 115, through the GUI 325 and the TV screen, requesting him/her to provide the number of his/her cellular phone 170 (block 521). The user may perform this operation by using the input interface of the STB (e.g., by using the STB remote control, or a control console) for inputting his/her cellular phone number. The ID detection master application 315 communicates the association cellular phone number/STB's ID to the information Server, over the return channel 155 (block 523).

It is observed that the user 115 may perform the actions relating to the association of his/her STB's ID with his/her cellular number whenever he/she wants, for example upon subscribing to the service: the STB's ID and the cellular phone number will be stored in the table 175 held by the information server. In particular, the ID detection master application 315 may be manually operated by the consumer 115, i.e., without the need to receive a request from the information server, for a first time (or subsequently when an update is needed, for example for modifying the cellular phone number), when the user wishes to associate one (or more) cellular phone number with the STB's ID.

In addition to inputting the cellular phone number, the uses may be requested (at least the first time) to enter a personal identifier (e.g., "USERi"), provisioned upon subscription, adapted to make him/her identified by the information server as a subscriber of the service.

Also, the user may disable any prompt request at his/her STB (in case the he/she does not want to provide his/her cellular number).

It can be appreciated that, advantageously, multiple distinct users of a same STB can perform the same submission using the ID detection master application 315, each user having the possibility of providing his/her own personal cellular number (e.g., these users may be the members of a family sharing the same STB and TV set). Moreover, in case the STB 145 is changed (and therefore a previously submitted association is not valid anymore, due to the fact that the new STB's ID differs from the that of the old STB), the sane STB ID/cellular phone number association operation can be repeated, either started by the user, or under request of the information server: the inforrnation server can thus update the user's entry in the association table with the new STB ID.

In alternative embodiments, when the information server 135 ascertains that an entry is already present in the table 175 for the received STB's identifier (and one or more user's cellular phone numbers are present), the information server requests to the user, preferably through the STB, to confirm/modify the associated cellular phone number, or to select the desired cellular phone number from a list, as well as to add a new cellular phone number.

Figure 5B:
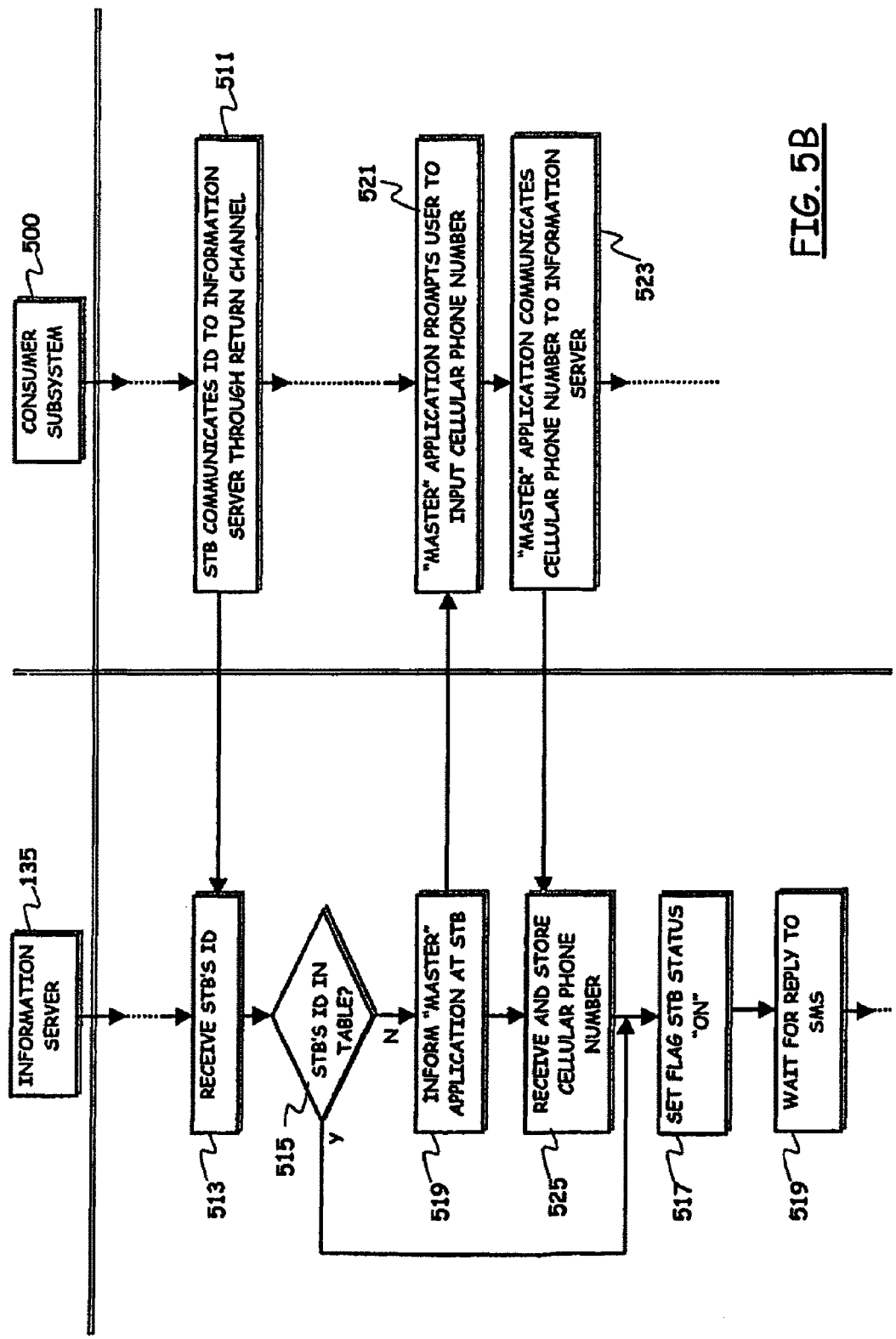
Figure 5C:
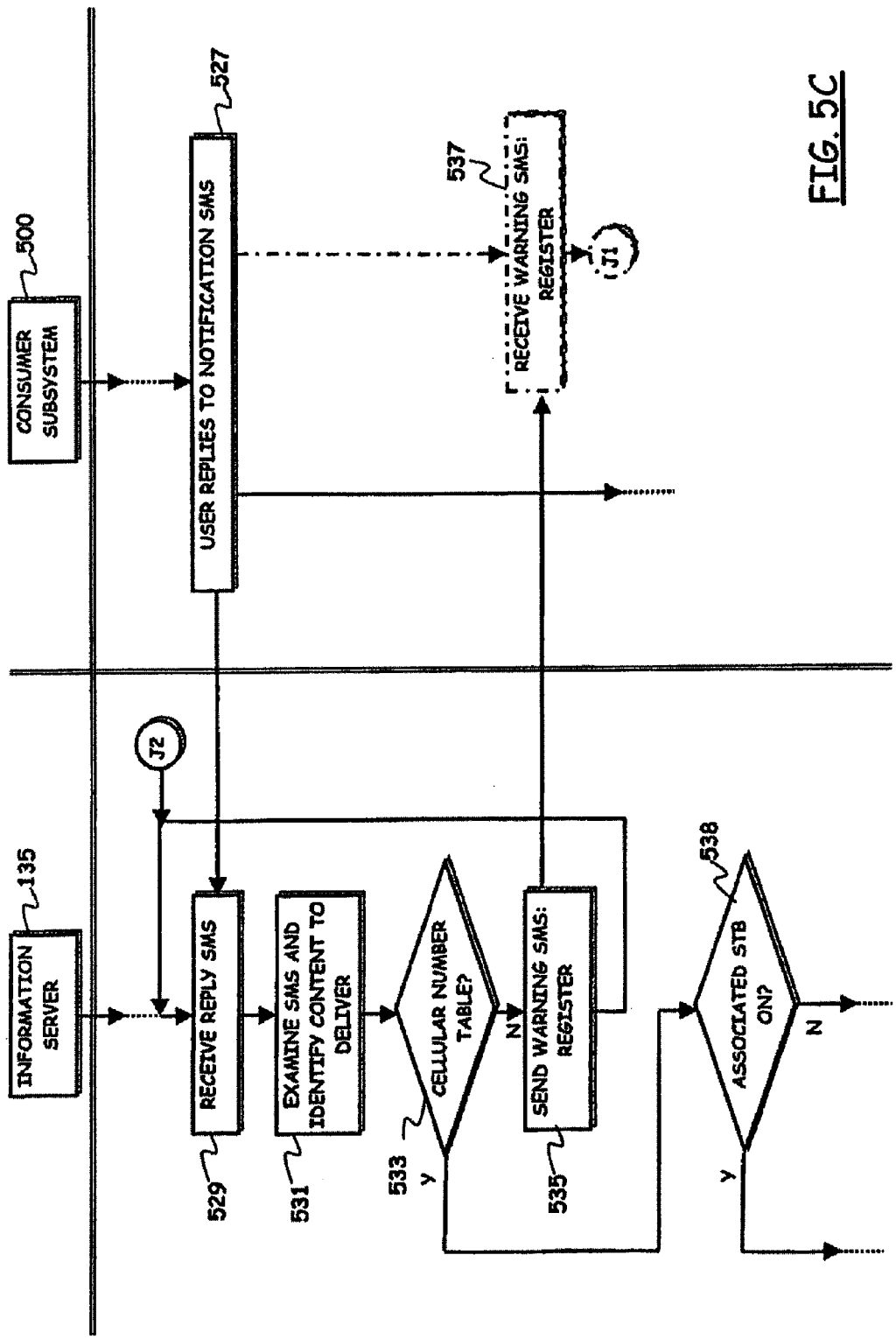
Figure 5D:
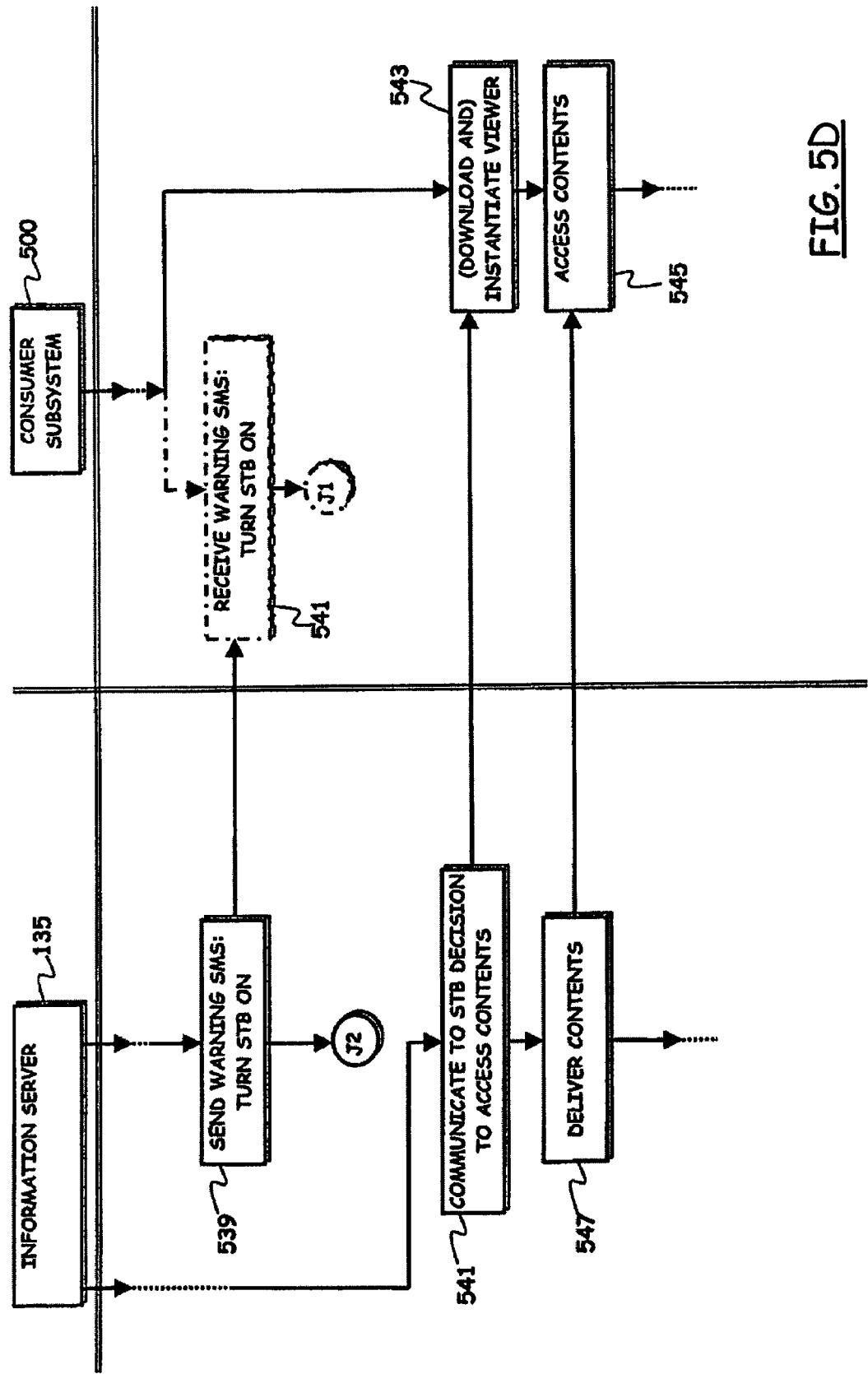

Back to the flowchart at FIG. 5B, the information server 135 receives from the ID detection master application 315 the cellular phone number of the user, and stores it in the association table 175 in association with the user's STB ID (block 525); there is thus established an association between the STB and the user's cellular phone number. Then, the information server sets the STB status flag to "ON" in the table (block 517), and waits for the reply by the consumer user 115 to the notification SMS (block 519).

When the user 115 decides to do so, he/she replies to the notification SMS previously sent by the information server 135 for notiing the presence of newly published contents (block 527). By replying to the SMS, the user expresses his/her willingness in accessing the new contents on his/her STB 145.

It has to be noted that thanks to the peculiar SMS formatting described above, no action is required to be performed by the user, apart from a simple reply to the previously received SMS message. When the user 115 replies to the received SMS 180 using his/her mobile communications terminal 170, the reply SMS message is sent to the destination number represented by (adopting the above example) the "333777" digits. Once such reply SMS message is transmitted, it is received at the SMS-C 160. which is configured to interpret as meaningfiul only the first (three in the example) digit of the destination number, i.e. the digits "333" identifying the information server 145, and uses these digits to select a suitable application for dispatching the reply SMS to the information server.

Thanks to the peculiar SMS format, the user does not need to fill the body of the reply SMS, or to specify anything else additional: he/she simply replies to the received notification SMS.

The reply SMS is thus sent from the user's mobile communications terminal 170 to the mobile network, and received at the SMS-C 160, which forwards it to the information server 135.

The information server 135 receives the reply SMS message (block 529) and examines the received SMS, thus identifying the digits (in the example, the "777" digits) which univocally indicates the contents 110 to be sent to the consumer user (block 531).

The information server 135 extracts from the reply SMS the cellular phone number of the user 115 who replied to the notification SMS, and then searches for this number in the association table 175, so as to find out whether the cellular phone number is associated to an STB identifier (decision block 533).

In the negative case (exit branch "N" of decision block 533), meaning for example that the consumer user has not yet completed the registration procedure to the service, by providing his/her cellular phone number and the the STB ID, the information server 145 preferably sends a warning SMS to the consumer user 115, inviting him/her to register for the service. The user 115 receives the warning SMS on his/her mobile communications terminal (block 538); it will be up to the consumer user to register his/her STB to the service: this can be done as described before, by tuning the STB onto the proper TV broadcast channel, so as to download the "master" Xlet. When the user will have properly registered his/her STB to the service, the user will have to reply again to the initial notification SMS, for activating the delivery of the contents (connector J1, jumping back to block 505).

In the affirmative case (exit branch "Y" of decision block 533), the information server 135 is able to establish an association between the cellular phone number extracted from the received reply SMS, and an STB ID found in the association table 175.

The information server 135 then checks the current status of the user's STB (decision block 537).

If the information server 135 finds that the STB is at the moment off (exit branch "N" of decision block 537) (the status flag in the association table 175 is set to "OFF", which for the information server 135 means that at that moment the "master" Xlet doesn't appear to be running), the information server sends a warning SMS to the consumer user 115, inviting him/her to switch the TV set and the STB on to receive the contents 110 (block 539).

The user 115 receives the warning message on his/her mobile communications terminal (block 541). It is up to the user 115 to turn the TV set and the STB 145 on, tune onto the proper TV channel (so as to download the "master" Xlet and have the STB "ON" status signaled to the information server 135, and then re-send a reply SMS to the original notification SMS, so as to activate the delivery of the contents (connector J1, jumping back to block 505, for the consumer subsystem, and connector J2, jumping back to block 529, for the information server). In alternative embodiments, re-sending of the confirmation SMS (in reply to the original notification SMS) may be avoided, with proper logic.

If instead the information server 135 finds that the STB 145 is currently on (exit branch "Y" of decision block 537), the contents 110 can be sent to the user 115. To this purpose, the ID detection master application 315 may cooperate with the information server 145 for receiving and instantiating a service-specific consumer application, such as the viewer 330 of FIG. 3, which is fed with the proper parameters in order to retrieve the content 110 and present it to the consumer 115.

In particular, the information server 135 communicates to the STB 145 the intention of the user 115 to access to the contents 110 (block 541). To this purpose, the return channel 155 is exploited, and the information server 135 may communicate with the ID detect master application 115 running at the STB 145 (block 543).

The ID detection master application 315 downloads (or receive in push) the code of the suitable consumer application associated with the content 110, if not yet available on the STB, and instantiates it (block 543); the ID detection master application 315 also passes to the consumer application 330 as argument either the link to, or the content 110.

The user 115 accesses the content 110 through his/her STB 145, which is made available and handled by the proper Consumer Application 330 (block 545).

In particular, the contents 110 may be received over the return channel 155, through the internet 130, or they may be made available to the STB 145 through the broadcast TV channel by broadcast network 150 (for this purpose connected by an internet connection to the information server 145, for example, or directly to the producer user); in this last case, encryption of the multimedia contents is preferably envisaged, in order to make their fruition possible only by the intended consumer user.

Optionally, while the consumer user 115 accesses the contents 110, the consumer application 330 can communicate to the information server the fact that the user started accessing the content, so that the information server can send an SMS to notify the producer user 105 of this fact.

In an alternative embodiment of the invention, a peer-to-peer architecture for content sharing and accessing is envisaged: in such a case the contents 110 need not be uploaded to the information server, and they may be fetched in a peer-to-peer mode directly from the producer user 105. In this case, only the notification of the availability of new contents and their location need to be sent to the information server 135.

The described operation flow is merely exemplary and not limitative of the present invention: alternative embodiments are in fact possible.

For example, concerning the contents made available, it may be possible adopt a similar scheme for notifying users of the availability of new applications (e.g., a new game, a T-government tool, etc.), or of the possibility to contribute to an opinion poll, etc. Thus, the present invention has a rather broad application, ranging from (personal) content sharing to i-advertisement, from infoteinment to T-commerce.

Also, instead of using SMS, the notification to the consumer users might be based on Instant Messaging, e-mail or any other messaging system, as well as on a combination of these means. The users may also be given the opportunity to select which notification channel they prefer. Alternative ways of identification of the consumer user in the mobile communications network are possible in place of the mobile telephony number, for example in case of IMS-capable terminals a SIP URI may be exploited.

In addition to notifying the producer user of the fruition, by the consumer users, of the produced and published contents, other kinds of feedbacks might be sent to tbe producer; for example, the producer might be notified of which consumers are currently exploiting the contents, and the connection time; additionally, the consumer users might be allowed to add textual/multimedia information to the fruited content and to tend the added content back to the producer or to share it with all the consumers.

Different architectural solutions for the information server can be envisaged; for example, a light information server might maintain only the logic for handling the cellular number/STB ID association table, while enucleating any application-specific logics (e.g. logic for interactive polls) and content repositories (e.g. video archives), which can be outsourced to ancillary external systems.

Although the present invention has been disclosed and described by way of some embodiments, it is apparent to those skilled in the art that several modifications to the described embodiments, as well as other embodiments of the present invention are possible without departing from the spirit or essential features thereof/the scope thereof as defined in the appended claims.

The invention claimed is:

1. A method for enabling use of contents by a user of at least one set top box adapted to receive broadcast TV signals, comprising:
    establishing an association between at least one identifier of the user in a communications network and at least one identifier of said at least one user's set top box;
    receiving, at an information server associated with an IP network, contents published by a producer and a list of consumers that registered to be notified of the receipt of the contents, wherein the list of consumers includes the at least one identifier of the user;
    notifying the user of the availability of the contents, wherein said notifying comprises exploiting said at least one identifier of the user in the communications network and sending a notification message to the user via a messaging service of the communications network and/or a short messaging service;
    receiving, via the messaging service of the communications network and/or the short messaging service, a confirmation by the user; and
    upon receiving the confirmation by the user, delivering the contents to the user's set top box, wherein said delivering comprises identifying the at least one user's set top box exploiting said at least one identifier thereof.

2. The method according to claim 1, further comprising establishing an association between said contents and said user.

3. The method according to claim 1, wherein said notifying comprises addressing the user by means of said at least one identifier of the user in the communications network.

4. The method according to claim 1, wherein said establishing an association comprises providing a server apparatus adapted to store the at least one identifier of the user in a communications network, and the at least one identifier of said at least one user's set top box, and to establish an association therebetween.

5. The method according to claim 4, wherein said server apparatus is connected to a packet data network.

6. The method according to claim 5, wherein the packet data network is the Internet.

7. The method according to claim 5, further comprising providing a return channel for the at least one user's set top box, said return channel being connected to the packet data network and allowing the user's set top box to communicate with the server apparatus.

8. The method according to claim 7, wherein said at least one identifier of the at least one user's set top box is communicated to the server apparatus by the user's set top box through the return channel.

9. The method according to claim 7, wherein the at least one identifier of the user in the communications network is communicated to the server apparatus by the user's set top box through the return channel.

10. The method according to claim 9, further comprising:
    having the at least one user's set top box request the user to input the at least one identifier of the user in the communications network.

11. The method according to claim 7, further comprising: having the set top box communicate to the server through the return channel, a current working status thereof.

12. The method according to claim 11, wherein said delivering the contents comprises:
    having the server preliminarily check a current set top box status.

13. The method according to claim 12, further comprising:
    in case the server determines that the set top box is not currently working, notifying the user of the status of the set top box through the communications network.

14. The method according to claim 7, wherein said delivering the contents comprises delivering the contents via the return channel.

15. The method according to claim 4, wherein said notifying is caused by the server apparatus.

16. The method according to claim 1, wherein said at least one identifier of the set top box comprises one or more among an identifier code stored in a storage area of the set top box or in a smart card operatively associated therewith, an identifier of the return channel, a telephony number of a telephony network exploited for setting up a return channel, or a media access control or a network interface card address of the set top box.

17. The method according to claim 1, wherein said at least one identifier of the user in the communications network comprises one or more among a telephony network identifier or an e-mail address.

18. The method according to claim 17, wherein said communications network comprises a mobile telephony network, and said at least one identifier of the user in the communications network comprises a mobile telephony identifier.

19. The method according to claim 18, wherein said sending the notification message comprises including in the notification message, a message sender identifier comprising a first part adapted to identify the notification message issuing entity, and a second part adapted to identify the contents object of the notification.

20. The method according to claim 19, wherein said confirmation by the user comprises a reply message to the notification message.

21. The method according to claim 1, wherein said delivering the contents comprises delivering the contents via broadcast TV signals.

22. The method according to claim 21, further comprising encrypting the contents delivered.

23. The method according to claim 1, wherein said communications network is external to a broadcast TV network used for broadcasting the TV signals.

24. A system comprising:
    at least one set top box adapted to receive broadcast TV signals; and
    at least one communications network;
    said system being adapted to:
        establish an association between at least one identifier of a user of the at least one set top box in a communications network and at least one identifier of said at least one user's set top box;
        receive contents published by a producer and a list of consumers that registered to be notified of the receipt of the contents, wherein the list of consumers includes the at least one identifier of the user;
        notify the user of the availability of the contents usable by the user, by exploiting said at least one identifier of the user in the communications network and sending a notification message to the user via a messaging service of the communications network and/or a short messaging service;

receive, via the messaging service of the communications network and/or the short messaging service, a confirmation by the user; and upon receiving the confirmation by the user, identify the at least one user's set top box exploiting said at least one identifier thereof and deliver the contents to the user's set top box.

25. The system according to claim 24, further adapted to establish an association between said contents and said user.

26. The system according to claim 24, further adapted to notify the user by sending a message over the communications network, and address the user by means of said at least one identifier of the user in the communications network.

27. The system according to claim 24, comprising a server apparatus adapted to store the at least one identifier of the user in a communications network and the at least one identifier of said at least one users set top box, and to establish said association therebetween.

28. The system according to claim 27, further comprising a packet data network to which said server apparatus is connected.

29. The system according to claim 28, wherein the packet data network is the Internet.

30. The system according to claim 28, further comprising a return channel for the at least one user's set top box, said return channel being connected to the packet data network and allowing the user's set top box to communicate with the server apparatus.

31. The system according to claim 30, wherein the at least one user's set top box is adapted to communicate said at least one identifier thereof to the server apparatus through the return channel.

32. The system according to claim 30, wherein the at least one user's set top box is further adapted to communicate the at least one identifier of the user in the communications network to the server apparatus through the return channel.

33. The system according to claim 32, wherein the at least one user's set top box is further adapted to request to and receive from the user, the at least one identifier of the user in the communications network.

34. The system according to claim 30, further adapted to cause the delivery of the contents via the return channel.

35. The system according to claim 27, wherein said server apparatus is further adapted to cause said notifying.

36. The system according to claim 27, wherein the set top box is further adapted to communicate to the server a current working status thereof through the return channel.

37. The system according to claim 36, wherein said server apparatus is further adapted to condition the delivering of the contents to a preliminary check of the current set top box status.

38. The system according to claim 37, wherein the server is further adapted to notifying the user of the status of the set top box through the communications network in case the set top box is not currently working.

39. The system according to claim 24, wherein said at least one identifier of the set top box comprises one or more among an identifier code stored in a storage area of the set top box or in a smart card operatively associated therewith, an identifier of the return channel, a telephony number of a telephony network exploited for setting up a return channel, or a media access control or a network interface card address of the set top box.

40. The system according to claim 24, wherein said at least one identifier of the user in the communications network comprises one or more among a telephony network identifier or an e-mail address.

41. The system according to claim 40, wherein said communications network comprises a mobile telephony network and said at least one identifier of the user in the communications network comprises a mobile telephony identifier.

42. The system according to claim 41, wherein said notification message comprises a message sender identifier comprising a first part adapted to identify the notification message issuing entity and a second part adapted to identify the contents object of the notification.

43. The system according to claim 41, wherein said confirmation by the user comprises a reply message to the notification message.

44. The system according to claim 24, further comprising a broadcast TV network adapted to cause the delivery of the contents via broadcast TV signals.

45. The system according to claim 44, further adapted to encrypt the delivered contents.

46. The system according to claim 24, wherein said communications network is external to a broadcast TV network broadcasting the TV signals.

47. A server apparatus adapted to enable use of contents by a user of at least one set top box adapted to receive broadcast TV signals and being configured to interact with the at least one set top box through a communications network, the server apparatus being further adapted to:

establish an association between at least one identifier of a user of the at least one set top box in the communications network and at least one identifier of said at least one user's set top box;

receive contents published by a producer and a list of consumers that registered to be notified of the receipt of the contents, wherein the list of consumers includes the at least one identifier of the user;

notify the user of the availability of the contents usable by the user, by exploiting said at least one identifier of the user in the communications network and sending a notification message to the user via a messaging service of the communications network and/or a short messaging service;

receive, via the messaging service of the communications network and/or the short messaging service, a confirmation by the user; and upon receiving the confirmation by the user, identify the at least one user's set top box exploiting said at least one identifier thereof and cause the delivery of the contents to the user's set top box.

* * * * *